Jan. 24, 1967 H. H. WOODBURY 3,300,671

SURFACE-ADJACENT JUNCTION ELECTROLUMINESCENT DEVICE

Filed March 10, 1964

Inventor:
Henry H. Woodbury, by John F. Ahern
His Attorney.

United States Patent Office 3,300,671

Patented Jan. 24, 1967

3,300,671

SURFACE-ADJACENT JUNCTION ELECTRO-LUMINESCENT DEVICE

Henry H. Woodbury, Niskayuna, N.Y., assignor to General Electric Company, a corporation of New York Filed Mar. 10, 1964, Ser. No. 350,768
3 Claims. (Cl. 313—108)

Figure 1:
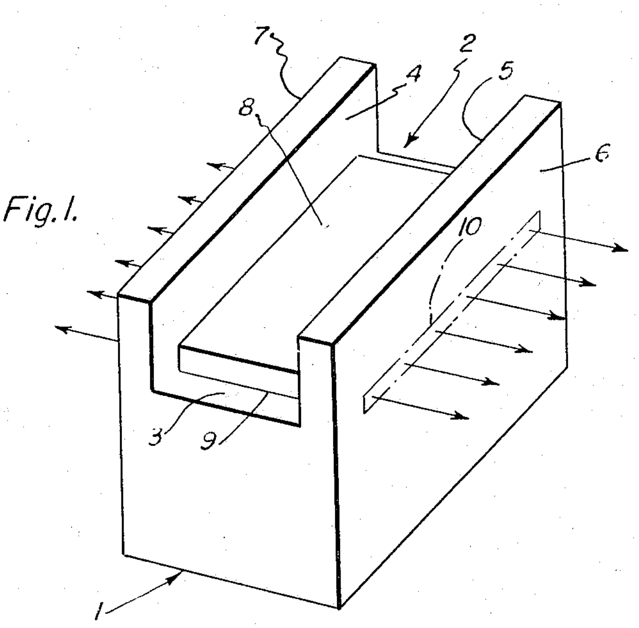

The present invention relates to surface-adjacent junction electroluminescent devices and more particularly relates to means for improving the resolution of the light beam emitted therefrom.

Semiconductor devices which exhibit electroluminescence, particularly those capable of laser action, have recently been developed and have already proven their importance in a number of applications. In general, these include various types of lighting and, particularly, communication by modulation of the emitted beam. In many of these applications, it is of the utmost importance that the resolution of the emitted beam be as high as possible. Accordingly, it is necessary that the light emission surface be as smooth as possible so that the emitted beam is not scattered due to varying angles of incidence with the boundary between the device and the surrounding medium.

Further, it is normally desired to provide such devices with two parallel emission surfaces to form a Fabry-Perot cavity within which the light is reflected between the surfaces to build up the amplitude. In such a situation, it is of critical importance that the surfaces be as flat and as parallel as possible so that the light actually travels entirely within the junction region.

In some cases, junctions may be prepared deeply within the body of the crystal and, in these cases, etching and polishing is sufficient to achieve the necessary flatness of the emission surface. However, in many cases it has been found that the junction must be prepared at or near the surface of the crystal. For example, in the case of diffusion of an impurity into a crystal, the diffusion coefficient may be very low and it may not be possible to diffuse the impurity deeply into the crystal. In the case of epitaxial deposition, the material being deposited may be of such a high resistivity that the thickness of the layer is limited by considerations of electrical conductivity. Also, for reasons which are not completely understood, some materials simply cannot be deposited to thicknesses greater than a critical value. In other cases, it has been found that mechanical difficulties such as breaking or chipping may occur if a critical thickness is exceeded.

With regard to these surface-adjacent junction devices, difficulties have been encountered in achieving the necessary flatness of the emission surface. In the case of epitaxially deposited layers, it is not possible to control the edges of the layer with sufficient precision to maintain perpendicularity between them and the substrate surface. Even later etching or polishing of the sides of the resultant crystal does not solve this problem, since the etching cannot be controlled so precisely as to remove small irregularities and because polishing has been found to break off chips which destroy the necessary flatness. Similar difficulties arise in devices prepared by diffusion techniques. Accordingly, there is a need for surface-adjacent junction electroluminescent devices having flat emission surfaces and the present invention is directed to means for providing such surfaces thereon.

Accordingly, it is an object of the present invention to provide a surface-adjacent junction electroluminescent device capable of emitting a substantially parallel light beam.

A further object of the present invention is the provision of a surface-adjacent junction electroluminescent device having a flat emission surface.

Another object of the present invention is the provision of a surface-adjacent junction electroluminescent crystal having an optically-matched medium covering its emission surface.

A further object of the present invention is the provision of a surface-adjacent junction electroluminescent device which is capable of being polished to optical flatness.

Finally, it is an object of the present invention to provide a surface-adjacent junction electroluminescent device having two smooth parallel surfaces perpendicular to the junction region between which the light is reflected to increase its amplitude.

Briefly, in accord with one embodiment of the present invention, I provide a surface-adjacent junction electroluminescent device which comprises a semiconductive crystal of a first conductivity type and a surface-adjacent region of a second, opposing conductivity type semiconductive material forming a continuation of the crystal. The materials of the crystal and layer and of any doping impurities are selected so as to form an electroluminescent junction region between the opposing conductivity materials. The device is provided with at least one substantially smooth emission surface through which light generated in the junction region is transmitted. The emission surface is perpendicular to the planar junction region. More specifically, I provide a transmissive layer overlying the emissive edge of said junction region and extending a distance greater than the thickness of the surface-adjacent layer beyond the junction region. The exterior surface of the layer comprises an emission surface which is perpendicular to the plane of the junction region and is polishable so as to be substantially smooth and enable parallel transmission of a light beam generated in the junction region.

In a specific embodiment of the present invention, the surface-adjacent layer is provided in a cavity or slot produced in the crystal, and at least one exterior surface of the crystal perpendicular to the junction region is polished smooth. In a second specific embodiment, the crystal together with the surface-adjacent layer is encapsulated in a material having a matching index of refraction so that a surface of the enclosing material perpendicular to the junction region may be polished flat to allow parallel transmission of the emitted beam.

Figure 2:
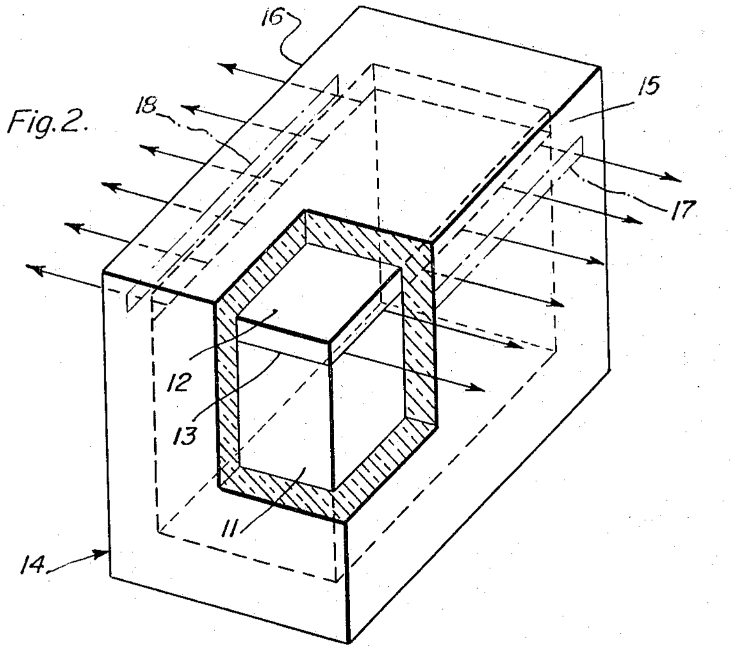

The subject matter which I regard as my invention is particularly pointed out and distinctly claimed in the concluding portion of this specification. The invention, however, both as to organization and method of operation, together with further objects and advantages thereof may best be understood by reference to the following description taken in connection with the accompanying drawings wherein like reference characters refer to like elements and in which:

FIG. 1 is a perspective view of an electroluminescent device constructed in accordance with a first form of the present invention; and FIG. 2 is a perspective view of an electroluminescent device constructed in accordance with a second embodiment of the present invention.

The electroluminescent device illustrated in FIG. 1 comprises a crystal 1 of semiconductive material of a first conductivity type having a cavity or slot 2 therein. The floor 3 of the slot is preferably polished to optical flatness and the walls 4 and 5 are perpendicular thereto. The exterior surfaces 6 and 7 of the crystal are polished to a sufficient degree of flatness to allow parallel transmission of the emitted light beam. Also, the surfaces 6 and 7 may be parallel and coated with a partially or completely reflective coating so that reflection of the light therebetween will cause a buildup of the light amplitude. A surface-adjacent layer 8 of the second, opposing conductivity type is provided within the slot 2 as a continuation of the crystal 1. A narrow junction region 9 is produced therebetween.

The materials from which the crystal 1 and layer 8 are prepared may be any of those which produce injection electroluminescence in the junction region 9 between the opposing conductivity types, and which are subject to the necessity of having the junction at a surface-adjacent location. For example, injection electroluminescence has been found to occur at heterojunctions between I–VI: II–VI compounds which are respectively p-type and n-type and from p-n junctions produced in crystals of II–VI compound crystals. It has also been found that these crystals are subject to the surface-adjacent junction limitation previously discussed. The Roman numerals used refer to the respective Groups of the Periodic Table.

As described above, in previous electroluminescent devices having surface-adjacent junctions, it has not been possible to obtain emission surfaces having the requisite degree of flatness. In the embodiment of the present invention illustrated in FIG. 1, one light emission region 10 is part of a surface 6 which extends a substantial amount beyond the region 8 so that the entire surface may be polished to remove any irregularities arising during growth and so that any chipping or other irregularities which occur during polishing at the edges of the surface do not extend into the light emission region. Irregularities which might otherwise occur during the growth of the surface-adjacent layer do not arise in this embodiment since the production of that layer can be done in such a manner that the layer extends completely between and corresponds precisely to the two inner walls of cavity 2 through which it is desired to transmit the generated light.

The materials of the crystal 11 and layer 12 are selected as described above with regard to FIG. 1 to provide an electroluminescent junction 13 therebetween. The crystal is encapsulated in a dielectric material 14 which has an index of refraction substantially matching that of the junction region 13 and which is produced on the crystal in precise correspondence to the edge of region 13 so as to compensate for any irregularities therein by filling them. The layer of dielectric is made thick enough to allow its emission surfaces 15 and 16 to be polished to substantial smoothness, preferably to optical flatness, to enable parallel transmission of the emitted light beam through regions 17 and 18.

Although FIG. 2 illustrates complete encapsulation of the device in the dielectric 14, it is only necessary that this dielectric extend beyond the emissive edge of the junction region by a sufficient amount to enable polishing of the emission region 17. For example, it may only be necessary that the dielectric extend a distance slightly greater than the thickness of the surface-adjacent layer on each side of region 17.

It is of particular importance, however, that the dielectric material correspond precisely to the edge of the junction region 13 so as to compensate for any irregularities therein and also that the dielectric have an index of refraction closely matching that of the junction region. The material is also, of course, one which transmits the frequency generated in the device. For example, for crystals comprising ZnS and ZnSe, an appropriate dielectric is conveniently a glass based on arsenic, sulfur and bromine in approximately equal proportions or it may be the same material as the crystal.

In general, therefore, it can be seen that the present invention is directed to the provision of surface-adjacent junction electroluminescent devices which are provided with a smooth light emission surface. The term "surface-adjacent junction electroluminescent device" is intended to include all electroluminescent devices wherein the junction or optically active region is or must be prepared at or very close to the surface of the substrate crystal. Specifically, it has been found that junctions lying within 10,000 angstrom units of the surface of the crystal are subject to the irregularities previously described.

However, it is not intended to limit the application of the present invention to devices having junctions within 10,000 angstroms of the surface since the present invention is applicable to any device where such irregularities at the edge of a surface-adjacent layer must be overcome, whether the layer is semiconductive or otherwise.

The following specific example serves to illustrate an electroluminescent device in which the present invention has been utilized. This is not intended as a limitation of the present invention, but rather as an example of a specific embodiment thereof.

A crystal of p-type ZnSe was prepared in accordance with the process described by W. Piper and S. Polich in the Journal of Applied Physics 32, 1278 (1961) and ground and polished to form a cube. A slot was ground into the crystal using a diamond saw and the two exterior surfaces corresponding to reference numerals 6 and 7 in FIG. 1 were polished to be optically flat and parallel. The slot was 0.05 cm. wide, 0.03 cm. long and 0.1 cm. deep. The crystal was covered with a suitable protective wax, specifically Apiezon W wax, with the exception of an area of approximately $10^{-3}$ cm.$^2$ in the slot on which the surface-adjacent layer was to be deposited. This area was then etched with concentrated NaOH and a layer of $Cu_2Se$ was deposited thereon to a thickness of one micron (10,000 angstrom units). The wax was removed and the $Cu_2Se$ was converted to n-type conductivity by heat-treating the crystal.

It was observed that the emission surfaces of the device were optically flat and parallel. When injection electroluminescence was stimulated within the junction region, the light output from the device was observed to be a well-defined line of light rather than a large area, unresolved output.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit of my invention.

What I claim as new and desire to secure by Letters Patent of the United States is:

1. A surface-adjacent junction electroluminescent device for emitting a substantially parallel light beam comprising a crystal of semiconductive material of a first conductivity type; a surface-adjacent region of a second, opposing conductivity type semiconductive material forming a continuation of said crystal; a planar electroluminescent junction region between said first and said second conductivity type materials; and a transmissive layer overlying the emissive edge of said junction region and extending a distance greater than the thickness of said surface-adjacent layer beyond said junction region to permit polishing of the external surface thereof, said layer having an emisison surface lying in a plane perpendicular to said junction region and being substantially smooth to enable parallel transmission of a light beam generated in said junction region.

2. A surface-adjacent junction electroluminescent device for emitting a substantially parallel light beam comprising a crystal of semiconductive material of a first conductivity type; a surface-adjacent region of a second, opposing conductivity type semiconductive material; a planar electroluminescent junction region between said first and said second conductivity type materials; and a layer of dielectric material on the exterior of said crystal and overlying the edge of asid junction region through which light is transmitted; said dielectric layer extending a distance greater than the thickness of said surface-adjacent layer to permit polishing of the external surface thereof; said dielectric layer having an index of refraction substantially equal to the index of refraction of said junction region, said dielectric layer having a substantially smooth emission surface through which light generated in said junction region is transmitted, said emission surface being perpendicular to said planar junction region so that light generated in said junction region is emitted in a substantially parallel beam.

3. A surface-adjacent junction electroluminescent device for emitting a substantially parallel light beam comprising a crystal of semiconductive material of a first conductivity type; a surface-adjacent region of a second, opposing conductivity type semiconductive material; a planar electroluminescent junction region between said first and said second conductivity type materials, said junction region lying within 10,000 angstrom units of the surface of said crystal; and a transmissive layer overlying the emissive edge of said junction region and extending a distance greater than the thickness of said surface-adjacent layer beyond said junction region to permit polishing of the external surface of said layer, said layer having an emission surface lying in said external surface in a plane perpendicular to said junction region and spaced by said distance from the edge of said junction region through which light is emitted so that polishing of said emission surfaces enables light generated in said junction region to be emitted in a substantially parallel beam.

References Cited by the Examiner

UNITED STATES PATENTS

| | | |
|---|---|---|
| 3,245,002 | 4/1966 | Hall. |
| 3,248,670 | 4/1966 | Dill et al. |
| 3,248,671 | 4/1966 | Dill et al. |

JAMES W. LAWRENCE, *Primary Examiner.*

R. JUDD, *Assistant Examiner.*